UNITED STATES PATENT OFFICE.

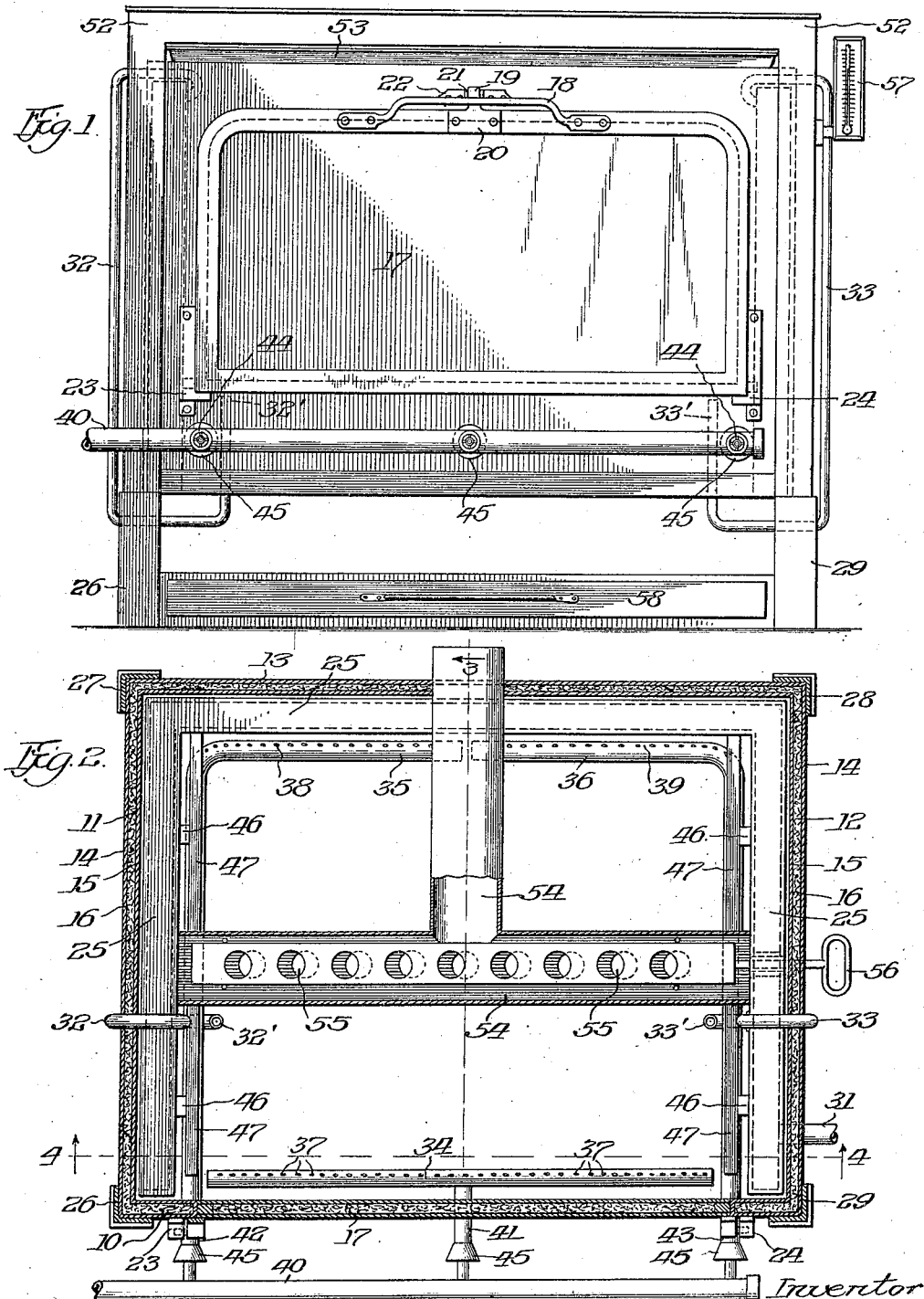

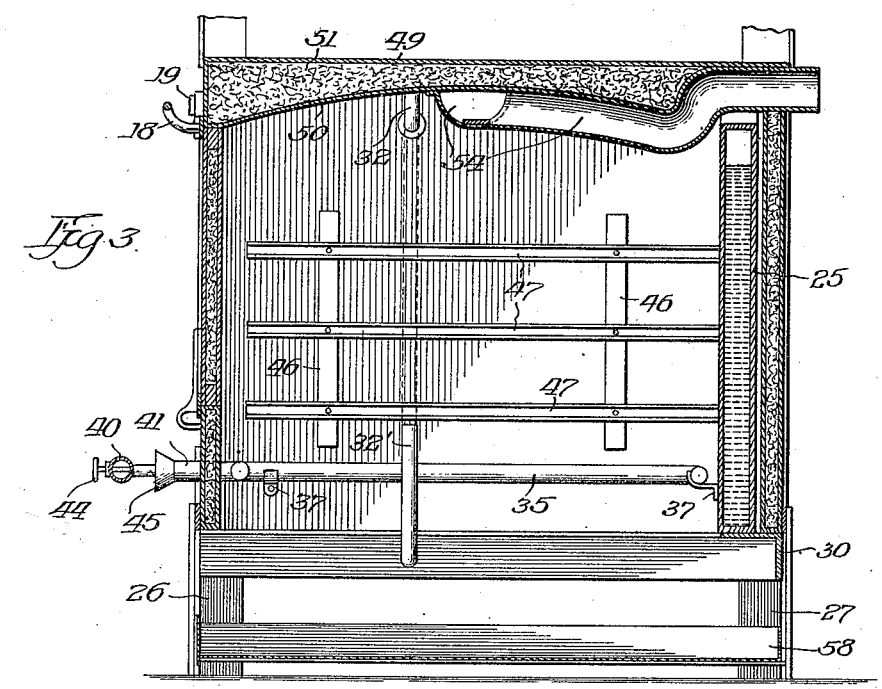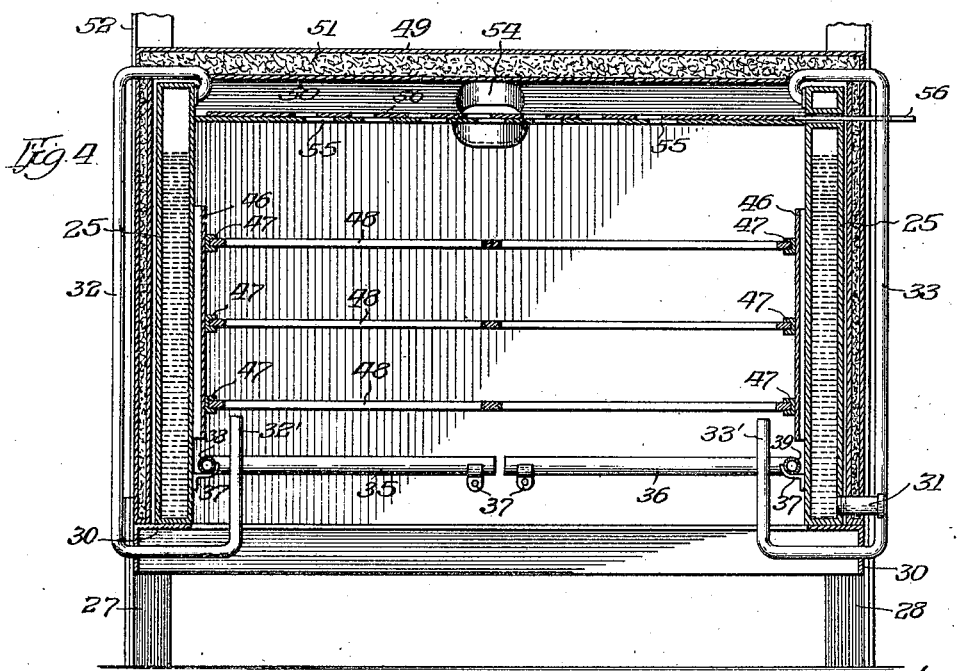

HENRY C. REUTER, OF CHICAGO, ILLINOIS, ASSIGNOR TO SAMUEL BLOCK AND HENRY C. REUTER, DOING BUSINESS AS BLOCK & REUTER, OF CHICAGO, ILLINOIS.

STOVE.

1,390,544.  Specification of Letters Patent.  Patented Sept. 13, 1921.

Application filed July 29, 1920. Serial No. 399,759.

*To all whom it may concern:*

Be it known that I, HENRY C. REUTER, a citizen of the United States, and a resident of Chicago, in the county of Cook, State of Illinois, have invented certain new and useful Improvements in Stoves, of which the following is a specification.

My invention relates to a stove, provided with a chamber in which food products, for example, meat, fowl and fish may be baked or roasted.

My invention has for its object the provision of an improved construction, arrangement and operation which, with very little fuel consumption, will enable one to secure desirable and important results in the baking or roasting of the meat, or other material. One of the results which is attained by the use of my improved construction is the elimination of the necessity for basting the meat, fowl, fish or other material. This, and other important results, are secured from the use of a plentiful supply of moisture which is obtained through the utilization of steam which flows to the interior of the stove, and may be obtained from any suitable source. In the preferred embodiment, illustrated, the steam is supplied from a water-jacket, employed in my improved construction, through pipes terminating in the interior of the stove, and I also employ a fresh air intake at the bottom of the stove by leaving the bottom of the stove thereof entirely open and free for the admission of fresh air. This steam, together with the moisture obtained from the condensation on the inner walls of the water-jacket assists in producing uniform baking and roasting of the material, with a small amount of loss of weight or shrinkage of the material, thus enabling the valuable juices of the foods to be retained and consequently improving the taste and making the foods tender, juicy and palatable.

Other objects of the invention as disclosed in my improved construction will be apparent from the drawings and from the following description of the stove and statement of its operation.

In the drawings:

Figure 1 is a front elevational view of my improved stove, showing portions of the water-jacket and steam pipes leading therefrom in dotted lines.

Fig. 2 is a plan view of my improved stove, partly in section and with the top cover removed.

Fig. 3 is a sectional view on lines 3—3 of Fig. 2, and

Fig. 4 is a sectional view on line 4—4 of Fig. 2.

The stove of my invention comprises a rectangular structure having the front wall 10, side walls 11 and 12, and the rear wall 13, which are formed with outer and inner sections 14 and 15, respectively, and are provided with heat insulating material, such as asbestos, 16, between said outer and inner sections. A door, 17, is placed in the front wall of the stove. This door is also formed with outer and inner sections, with asbestos material between. The door is provided with the handle 18. At the upper central portion of the door is the outwardly extending portion 19 of the plate 20 located in the central upper portion of the door 17, which is caught and frictionally held by the forked extension 21 of the plate 22 secured to the central upper part of the front wall. The door is hung at its two lower corners in the pivot supports 23 and 24. These pivot supports have ledges, on the faces of which the door rests when it is open.

Within the stove and adjacent the two side walls and the rear wall is provided a continuous and unitary receptacle 25 to contain water and forming a water-jacket for the stove.

The stove is supported by the four legs 26, 27, 28 and 29. Secured to the legs are the angle supports 30 which serve to support the walls of the stove and the water-jacket 25. A combined water inlet and outlet pipe 31 is shown near the bottom of the right hand side of the stove. The control mechanism to permit the filling of the water-jacket and the draining thereof is not shown.

Connected with the water-jacket I show a plurality of steam pipes, 32 and 33, in the present case two of such pipes. These extend from the top of the water-jacket in the interior of the stove, over the top of the water-jacket, through the inner wall sections 15, the heat insulating material or asbestos 16, the outer wall sections 14, down along the sides of the outer wall sections, are bent inwardly underneath the side walls 11 and 12 through the open air space beneath the stove, and are then bent upwardly in the extended portions 32′ and 33′ into the interior of the stove. The ends of the extensions 32' and 33' form nozzles for the passage into the interior of the stove of steam from the heated water within the water-jacket 25.

Of course it will be understood that with the extension pipes 32 and 33 on the exterior of the stove exposed to the atmosphere, the steam will be somewhat cooled, and that to the mechanic skilled in the art of stove manufacture, various modifications of the construction illustrated will readily suggest themselves, as for example, running the extensions 32 and 33 inside instead of outside the stove.

Near the bottom of the inner wall sections, and lying in the same longitudinal plane on all sides of the interior of the stove, are placed burner tubes 34, 35 and 36. These burner tubes are supported by the requisite number of bracket supports 37. I provide a separate burner pipe 34 adjacent the front wall of the stove, a separate burner pipe 35 adjacent the one side of the stove and extending adjacent the rear wall of the stove to nearly the center thereof, and I provide a third separate burner pipe 36 adjacent the opposite side of the stove and extending adjacent the rear wall of the stove to nearly the center thereof. The closed ends of the burners 35 and 36 do not touch each other but are closely adjacent each other. It will be seen that the fuel or flame openings 37 in the burner pipe 34 open inwardly and away from the front wall, while the fuel or flame openings 38 and 39 of the burner pipes 35 and 36, respectfully, open to the side and rear walls, respectively.

Gas is supplied to the burners 34, 35 and 36 through the main gas supply pipe or manifold and flows therefrom to the burner pipes 34, 35 and 36 through the leads 41, 42 and 43, respectively. The manifold 40 is supplied with valves 44 and the leads are supplied with the mixers or carbureting mechanism 45. It will be apparent that with this arrangement I may ignite the fuel in any one of the burners 34, 35 and 36, or any two, or all of them, as desired.

On the inside walls of the side walls of the water-jacket I secure grid supports consisting of the vertical bars 46 to which I secure a plurality of horizontal guide bars 47. Grids 48, upon which the food may be placed for baking or roasting, are slidably and removably secured in the guide bars 47.

My stove is provided with a top 49 and the concave domed ceiling 50. Between the top 49 and the ceiling 50 I have placed insulating material such as asbestos 51. I form the domed ceiling 50, as more particularly shown in Fig. 3, to provide an inner deflecting surface at the top of the interior of the stove. In Fig. 1, I have shown the front face of the stove raised beyond a line of the top 49 to form the portion 52 of the front. Beneath this, and shown resting on the top 49, is the drip pan 53 which will serve to catch the drippings and other material from a gas plate (not shown) which may readily be placed on the top of my stove.

Arranged along the central longitudinal line, and extending therefrom to the rear of the stove and into the chimney, (not shown), I have shown the flue 54. The central longitudinal portion of the flue is provided with a plurality of vent openings 55, controlled by the slide damper 56. In one of the walls and connected with the water-jacket I have shown a thermometer 57. Beneath the stove, and in the opening at the bottom, I have placed a drip pan 58. While I have shown a single and unitary drip pan it will be understood that a plurality of drip pans may be provided.

I wish to point out that instead of the three sided unitary water-jacket, I have illustrated in the drawings and described herein, I may employ a water-jacket composed of piping, or other suitable formation, for the purpose desired.

The stove of my invention may be modified to use electricity for heating instead of gas as I have illustrated and described it.

It will be noted that my stove is insulated on all four sides and the top with insulating material, such as asbestos, and that it is water-jacketed on three sides of its interior.

Although I have not shown it in the drawings, a water-gage may be employed to indicate the level of water in the water-jacket.

Referring to the operation of my stove, air enters the stove at the bottom thereof which is entirely open and free for its admission. When the burners are lighted the air, entering at the bottom below the burners, as it is heated rises to the top and will be deflected toward the center of the stove by the curved or domed ceiling and will flow downwardly and out again at the bottom of the stove. To be certain that enough moisture is always provided within the interior of the stove the steam pipes 32 and 33, terminating in nozzles at the end of the extensions 32' and 33', are provided. Any excess moisture in the air will be condensed against the surface of the water-jacket to be taken up again by the air as required. On account of such condensation the air flowing up along the water-jacketed walls will be cooler than the air near the unjacketed wall 10 and the door 17 but at the top of the interior of the stove they will mix and intermingle and will circulate about the material on the grids to effect uniform baking or roasting and will then pass out of the stove at the bottom. There will be just sufficient moisture in the mixture to prevent the moisture and juices in the food from being driven out by the heat, thereby preventing shrinkage and loss in weight. If high heat is desired the vent openings 55, in the flue 54 are closed and the door 17 is closed so that all the heat will pass upwardly and downwardly through the interior and around the material to be treated. If less heat is desired, the damper 56 can be adjusted to open the vents 55 accordingly, so that part of the heat can escape at the upper end of the interior, or the door 17 can be opened to permit cool air to flow into the interior, above the burners, to mingle with the heated air to keep it from becoming too hot. By turning on the gas as desired, and utilizing one, two, or three burners, and by adjusting the door and the vent openings, the stove can be regulated to a nicety to bake or roast under different degrees of heat or to bake or roast rapidly or more slowly depending upon the nature of the material to be treated.

I do not desire to be limited to the exact construction, arrangement and operation shown and described, as changes and modifications may be possible which would still come within the scope of the invention.

I claim:

1. A stove comprising an insulated chamber closed at its top and entirely open to the air at its lower end, and having a door, a water jacket lining within the chamber, heat generating means within the lower part of the chamber and means for supplying steam vapor from the water jacket to the interior of the chamber.

2. A stove comprising an insulated chamber closed at its top and entirely open to the air at its lower end, and having a door, a water jacket lining within the chamber, heat generating means within the lower part of the chamber and means for supplying steam vapor from the water jacket to the interior of the chamber, substantially adjacent to the heat generating means.

3. A stove comprising an insulated chamber closed at its top and entirely open to the air at its lower end, and having a door, a water jacket lining within the chamber, heat generating means within the lower part of the chamber and means for supplying steam vapor from the water jacket to the interior of the chamber, substantially adjacent to the heat generating means, the top being provided with a dampered vent opening.

4. A stove comprising a food receiving chamber interiorly water jacketed and having a closed top and a door both unjacketed and being entirely open to the air at its lower end, heat applying means in the chamber and means for supplying steam vapor from the water jacket to the lower part of the interior of said chamber near the conduit opening.

5. A stove comprising a food receiving chamber rectangular in shape and insulated and water jacketed walls, insulated top and an insulated door, legs supporting the chamber, heat generating means located within the lower part of said chamber, a vent in the top, and means for conducting vapor from the water jacket to the interior of the chamber, the chamber being entirely open at its bottom.

6. A stove comprising a sheet metal rectangular chamber having a door and an insulated closed and arched top, and entirely open to the air at its lower end, a water jacket extending interiorly of its rear and two side walls, insulation between said jacket and said walls, insulation for the front wall and the door, a heat supplying burner within the lower part of the chamber, a vent leading from the top of the chamber, and means for supplying steam vapor from the water jacket to the lower part of the chamber.

7. In a stove of the class described, the combination of a body part comprising four walls with insulated material between the inner and outer sections thereof, one of said walls including a door, a top, concave on its inside, with insulating material between the inner and outer sections thereof, the body part being entirely open at its lower end for the admission of air, a plurality of fuel burners in one plane near the lower end of the body part, a water-jacket, pipes from said water-jacket for conveying steam to the interior of the body part, a flue having adjustable vent openings, a slide damper to control said vent openings, grids above the burners to support material to be treated, and supports for said grids.

8. In a stove of the class described, the combination of a body part comprising four walls with insulated material between the inner and outer sections thereof, one of said walls including a door, a top, concave on its inside with insulating material between the inner and outer sections thereof, a body part entirely open at its lower end for the admission of air, a plurality of fuel burners in one plane near the lower end of the body part, a water-jacket, pipes from said water-jacket for conveying steam to the interior of the body part, which extend from the upper portion of the water-jacket, through the walls of the body part to the exterior thereof, and are returned through the opening at the lower end of the body part and into the interior thereof above the plane of the burners, a flue, having adjustable vent openings, a slide damper to control said vent openings, grids above the burners to support material to be treated, and supports for said grids.

In witness whereof, I hereunto subscribe my name this 27th day of July, A. D. 1920.

HENRY C. REUTER.